United States Patent [19]

Layden

[11] 4,428,763
[45] Jan. 31, 1984

[54] TRANSFER MOLDING METHOD OF PRODUCING FIBER REINFORCED GLASS MATRIX COMPOSITE ARTICLES

[75] Inventor: George K. Layden, Wethersfield, Conn.

[73] Assignee: United Technologies Corporation, Hartford, Conn.

[21] Appl. No.: 381,801

[22] Filed: May 25, 1982

[51] Int. Cl.³ .......................... C03C 27/00; B32B 5/02
[52] U.S. Cl. ..................................... 65/4.21; 65/18.1; 65/18.4; 65/43; 264/109; 264/112; 264/125; 428/114; 428/367; 428/697; 428/902; 501/95
[58] Field of Search ............... 501/89, 95; 65/3.2, 65/18.1, 18.4, 36, 4.21, 43; 264/109, 111, 112, 125; 428/902, 114, 367, 697

[56] References Cited

U.S. PATENT DOCUMENTS

| | | | |
|---|---|---|---|
| 4,256,378 | 3/1981 | Prewo et al. | 501/95 X |
| 4,324,843 | 4/1982 | Brennan et al. | 428/902 X |
| 4,341,826 | 7/1982 | Prewo et al. | 428/114 X |
| 4,353,966 | 10/1982 | Snitzer et al. | 428/902 X |

Primary Examiner—Robert L. Lindsay, Jr.
Attorney, Agent, or Firm—Harry J. Gwinnell

[57] ABSTRACT

A method of transfer molding fiber reinforced glass composite articles is described. The method has particular utility for providing strength in a particular direction in such a composite. The fibers are aligned in a mold cavity in a predetermined orientation to provide composite strength in particular directions, and a glass billet is heated and transferred to the mold. The article is cooled and removed from the mold producing a composite having longitudinal strength along the axes of the aligned fibers in the composite.

2 Claims, 3 Drawing Figures

200μm

TRANSFER MOLDING METHOD OF PRODUCING FIBER REINFORCED GLASS MATRIX COMPOSITE ARTICLES

The Government has rights in this invention pursuant to Contract No. N00014-81-C-0218 awarded by the Department of the Navy.

DESCRIPTION

1. Technical Field

The field of art to which this invention pertains is molding, and particularly methods of molding fiber reinforced composite articles.

2. Background Art

Because of the scarcity and increasing expense of many conventional high temperature structural metals, increased attention has focused on non-metal fiber reinforced composites as replacements for conventional high temperature metal alloys. Use of metal replacement, high strength fiber reinforced resin and even high strength fiber reinforced metal matrix composites has progressed to the point of commercial acceptance in products ranging from sporting goods to advanced jet aircraft components. One of the big problems with these composites, however, has been their maximum use temperature.

Ceramic, glass and glass ceramic bodies are known to the art which can be employed in high temperature applications. Unfortunately, however, these bodies frequently lack the mechanical strength desired and are invariably deficient in toughness and impact resistance. This situation has given rise to the preparation of composite bodies consisting of a matrix of ceramic, glass, or glass ceramic material with inorganic fibers dispersed in continuous or discontinuous fashion therein. Henceforth referred to as glass matrix composites, these materials are described in U.S. Pat. Nos. 4,314,852 and 4,324,843. Glass-ceramic matrix-silicon carbide fiber composite components prepared according to the teachings of the above referenced patents exhibit physical properties which permit their utilization in heat engines and other applications to effect significant improvement in performance. Such applications, however, require that novel methods of fabrication be found for the production of complex shaped parts with reinforcing fibers distributed, for example, in at least three directions to impart improved strength.

Even though great strides have been made in this area, difficulties exist in methods of preparing such improved composite articles. In the past, continuous fiber reinforcement for composite articles has been achieved through the use of collimated fiber tapes, felts and papers which are infiltrated with glass-carrier slurries, cut to size, and oriented and then stacked in a die for hot pressing. However, this procedure is inadequate for articles which will be stressed significantly in three principal directions in that it achieves only a planar array of fibers. It is also difficult to form cylinders and other complex shapes with such planar type materials.

In current resin matrix composite technology, this shortcoming is overcome through the use of woven fiber structures. The fibers are woven to make either cloth or actual article shapes. After weaving these articles can be easily infiltrated with resins due to both the very low viscosity achievable with resins prior to their curing, and also the ease with which these resins wet the fibers.

Another method which has been used to form fiber reinforced glass composite parts is injection molding. In this process, the billets of chopped fiber or whisker reinforced glass or glass-ceramic is injected into complex shape molds at high temperature to form the fiber reinforced glass composites of complex shape. This method is taught in commonly assigned, copending patent application Ser. No. 381,805, filed May 25, 1982 entitled "Molding Process for Fiber Reinforced Glass Matrix Composite Articles", filed on even date herewith. In this process, reinforcing fiber orientation is random and thus cannot be controlled to impart precisely engineered properties, i.e. strengths in particular directions, to composites for high performance applications.

Accordingly, what is needed in this art is a method of forming fiber reinforced glass matrix composites of complex shape which exhibit strength properties produced by carefully engineered fiber arrangements.

DISCLOSURE OF INVENTION

The present invention is directed to a method of making fiber reinforced glass or glass-ceramic matrix composite articles with a predetermined distribution of mechanical strength in particular directions. Such strength is accomplished by a matrix transfer molding operation after the fibers are aligned in the mold cavity in particular orientations chosen to provide the predetermined distribution of composite strength desired. A billet of glass matrix material is heated to a temperature above its working point and the glass matrix material is then slowly transferred under low pressure into the mold cavity to surround and bond the fibers. The thus molded article is then cooled and removed from the mold forming a composite article having the desired predetermined strength properties.

The foregoing and other features and advantages of the present invention will become more apparent from the following description and accompanying drawings.

BEST MODE FOR CARRYING OUT THE INVENTION

Figure 1:
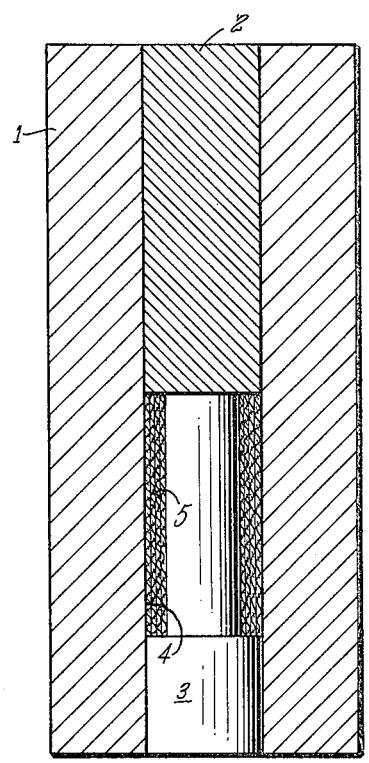
FIG. 1 shows schematically a typical transfer mold useful according to the present invention.

While many silicate glasses which will impart high temperature strength properties to composites according to the present invention can be used, Corning 1723 (Corning Glass Works) aluminosilicate glass has been found to be particularly suitable for this process, although borosilicate and high silica glasses are also suitable.

Another attractive matrix material for the process of the present invention is a glass-ceramic. During injection into the mold cavity, the matrix glass is molten and typically has a viscosity less than about $10^{-4}$ poises. After injection, the glassy matrix can be converted to the crystalline state, the degree and extent of crystallization being controlled by the matrix composition and heat treatment schedule employed. A wide variety of glass-ceramics can be used in this manner, however, when using silicon carbide fibers, a strict limitation on the amount and activity of titanium present in the glass is of controlling importance. Accordingly, if silicon carbide fibers and titania nucleating agents are used, the titania must be inactivated or kept below 1% by weight. This can be accomplished by simply substituting another nucleating agent such as zirconia for the conventional titania or adding an agent to mask the reactivity of the titania toward the silicon carbide fiber. However, in any case, it is necessary to either eliminate or mask the effects of the titania on the silicon carbide fiber to attain a composite with good high temperature strength properties. And while conventional lithium aluminosilicate is the preferred glass-ceramic, other conventional glass-ceramics such as aluminosilicate, magnesium aluminosilicate, and combinations of the above can be used as long as the ceramic matrix material is titanium free (less than about 1% by weight) or masked. Note commonly assigned U.S. Pat. No. 4,324,843, the disclosure of which is incorporated by reference.

While any high temperature stable fiber material wettable by the viscous matrix can be used in the method according to the present invention, silicon carbide fibers are especially preferred. A multifilament silicon carbide yarn with an average filament diameter up to 50 microns, for example 5 to 50 microns, is especially preferred. Nippon Carbon Company of Japan produces such a yarn with about 250 fibers per tow and an average fiber diameter of about 10 microns. The average strength of the fiber is approximately 2000 MPa and it has a use temperature of up to 1200° C. The yarn has a density of approximately 2.6 grams per cc and an elastic modulus of approximately 221 GPa.

Although the particular example below demonstrates a transfer molding process with a woven silicon carbide cloth, the process is equally useful with non-woven continuous fibers, discontinuous fibers, or combinations thereof.

The mass of the glass billet is generally the same mass as will be required to fully densify the final fiber reinforced article. The billet is heated to a temperature above its working point, i.e. the point at which the glass begins to flow and can be transferred into the mold. Typically, this temperature ranges from about 1000° C. to about 1500° C. Pressures used for transferring the heated billet into the mold cavity without moving or otherwise dmaging the fibers are generally in the range of about 10 psi (0.0688 MPa) to about 100 psi (0.688 MPa), although higher pressures may be used with tightly woven fiber structures. Fiber loading of the articles generally ranges from about 20% by weight to about 50% by weight.

Although generally the fibers are laid up by hand or by machine in a particular orientation to conform to the shape of the mold cavity, the fibers can be formed into the desired article shape, for example with a polymeric binder. This shape can then be placed in the transfer mold and the glass transferred in and about the fibers subsequent to removal of the temporary binder, for example by a preheat burnoff. Typical binders useful in this way are the Carboxwax ® series (Union Carbide Corp.) and especially Carbowax 4000, and acrylic resins such as Rhoplex ® (Rohm and Haas Corp.).

As stated above, the fibers are aligned in the mold cavity to provide strength in a particular direction. For example, for cylindrical shaped articles, fibers would be aligned in a direction around a central tubular mold core (circumferentially) to provide hoop strength, and fibers would be aligned in a direction along the axis of the cylinder (axially) to provide strength along the length of the cylindrical shaped article. Use of a woven material as in the Example below would provide such strength in both these directions. In fact, the use of weaving to provide the strength properties desired in complex shapes such as turbine blades is exemplary of the utility of this process

EXAMPLE

Figure 2:
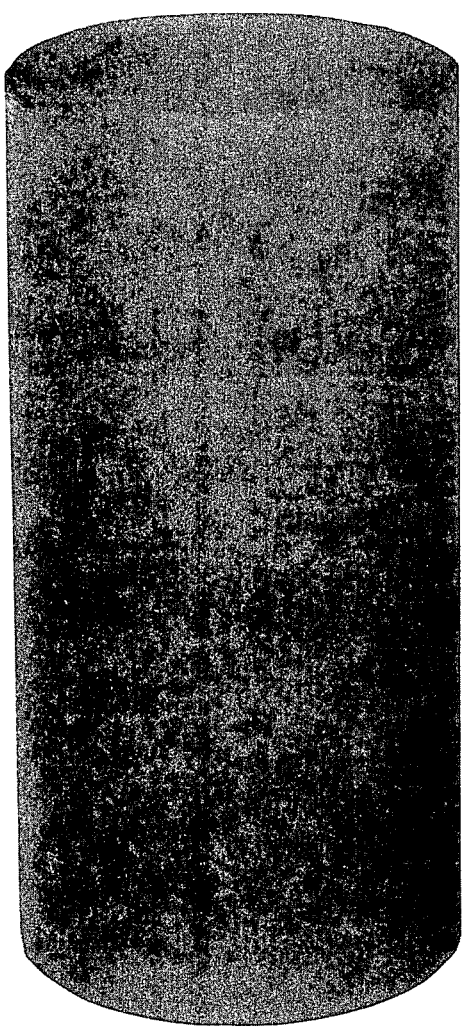
FIG. 2 shows an article molded according to the present invention.
Figure 3:
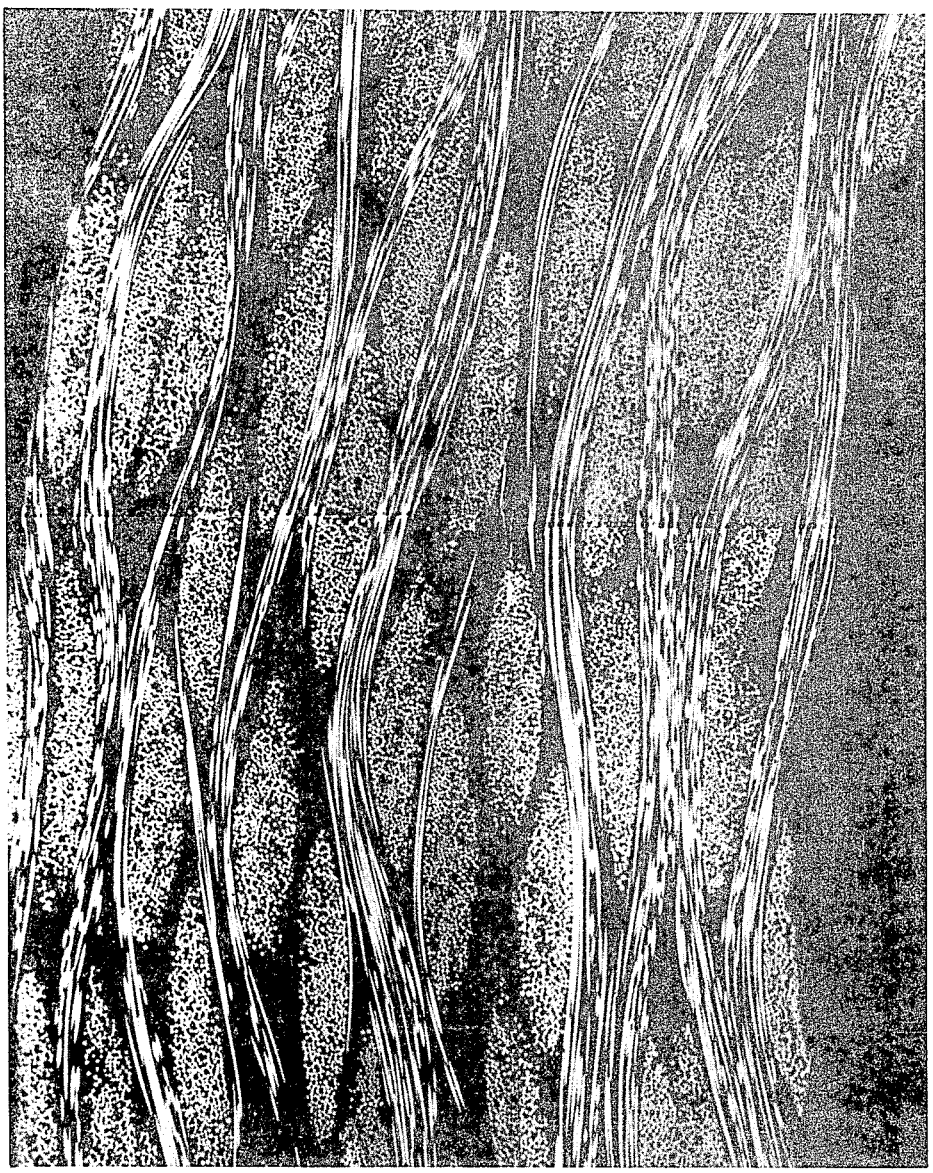
FIG. 3 is a photomicrograph showing typical microstructure of articles produced according to the present invention.

A three part cylindrical mold was machined from graphite as shown in FIG. 1. The outer mold wall (1) was 4.5 inches (11.4 cm) high with a glass transfer region as shown by the space occupied by plunger (2) 2.25 inches (5.7 cm) high. The overall thickness of the mold was 2 inches (5.08 cm) with 0.75 inch (1.9 cm) taken up by the plunger and mold transfer cavity with an inner mold core 0.5 inch (1.3 cm) in diameter. The height of the mold cavity (4) was 1.5 inches (3.8 cm). Thus constituted, the mold comprised an annular cavity (4) between the inner mandrel (3) and the outer mold walls (1) which define the shape of the part to be made, in this instance a pipe section. A reservoir region above this annular cavity is shown in FIG. 1 filled with a plunger (2) which transfers the glass material into the annular cavity. In this instance, the volume of the annular space was about 6 cubic centimeters. A strip of Nicalon ® silicon carbide plain weave cloth 1.5 inches (3.8 cm) wide and 21.6 inches (54.9 cm) long was placed in an oven and heated in air atmospheres to 700° C. in order to burn away the sizing. The weight of the cloth after burnoff was 5.31 grams. The cloth was tightly wound around the mandrel for a total of 11 turns to provide both longitudinal and transverse strength. This is shown as character 5 in FIG. 1. The mandrel and cloth were then inserted into the outer cylindrical wall of the mold assembly. The density of the silicon carbide yarn is 2.64 grams per cubic centimeter, the volume of fibers calculated to 2.01 cc or 33.6 volume percent of the annular space. Corning Glass Works 1723 aluminosilicate glass was procurred in billet form having a density of 2.64 grams per cubic centimeter. A cylindrical slug of this material was cut from the billet using a diamond cone drill, and trimmed to a weight of 11 grams, slightly above the 10.56 grams calculated to fill the remaining 4 cubic centimeter volume of the annular space (4). This was inserted into the region filled by the plunger (2) in FIG. 1 and the plunger inserted. The mold assembly was placed in a vacuum hot press and heated to 1300° C. A gauge pressure of 20 psi (0.138 MPa) was then applied to the 3 inch (7.6 cm) diameter hot press rams to force the molten glass into the void space. Under these conditions glass transfer was accomplished in about 10 minutes. The assembly was then cooled to room temperature. The mandrel and sample were removed from the outer cylinder and the mandrel was machined away from the finished article. A photograph of the finished article is shown in FIG. 2. As can be seen from FIG. 3, a composite micrograph of a polished cross section of the cylinder of FIG. 2, the fibers were not displaced or otherwise damaged and good fiber-matrix wetting (as evidenced by intimate contact) is observed.

Typical complex shapes which may be made by the process of the present invention are cylindrical shapes as shown in FIG. 2, hollow containers, and various contoured objects such as jet engine blades, burner can segments, etc. The articles of the present invention, based on the compositions of the components, have particular utility as high temperature structural components in environments where oxidation resistance, high strength and toughness are required, for example as gas turbine engine or internal combustion engine components. In this regard, note also U.S. Pat. No. 4,324,843, the disclosure of which is incorporated by reference.

Although the invention has been shown and described with respect to detailed embodiments thereof, it should be understood by those skilled in this art that various changes and omissions in form and detail may be made therein without departing from the spirit and scope of the invention.

I claim:

1. A method of making fiber reinforced glass matrix composite articles comprising aligning high temperature stable graphite, silicon carbide, or alumina fibers in a mold cavity circumferentially, axially, or both circumferentially and axially to provide composite strength in the particular direction of alignment, heating a billet of borosilicate, aluminosilicate, lithium aluminosilicate or high silica content glass matrix material to a temperature above about 1,000° C., transferring the glass matrix material into the mold cavity at a pressure of about 10 psi to about 100 psi to surround the bond the fibers with substantially no disturbance of the fiber orientation, cooling the thus impregnated fibers to a temperature below the strain point of the glass, and removing the fiber-matrix composite from the mold thus forming a composite article having composite strength in the particular direction of alignment.

2. The method of claim 1 wherein the fibers are selected from the group consisting of woven fibers, nonwoven fibers, continuous length fibers, discontinuous fibers, and mixtures thereof.

* * * * *